(12) United States Patent
Haas et al.

(10) Patent No.: US 6,533,564 B1
(45) Date of Patent: Mar. 18, 2003

(54) APPARATUS FOR FORMING ADHESIVE CARTRIDGES

(75) Inventors: Gerhard H. Haas, High Point, NC (US); Anthony Saenz, Greensboro, NC (US); Timothy R. Sumner, Trinity, NC (US)

(73) Assignee: Jowat Corporation, High Point, NC (US)

( * ) Notice: Subject to any disclaimer, the term of this patent is extended or adjusted under 35 U.S.C. 154(b) by 0 days.

(21) Appl. No.: 09/248,012

(22) Filed: Feb. 10, 1999

(51) Int. Cl.[7] ................... B65B 31/02; B65B 63/08
(52) U.S. Cl. ................ 425/72.1; 53/432; 53/435; 53/440; 425/112; 425/113; 425/308; 425/326.1; 425/378.1
(58) Field of Search .................. 425/112, 113, 425/308, 133.1, 404, 326.1, 378.1, 5, 72.1; 53/432, 435, 440, 561, 510, 127, 493, 293, 276; 156/243, 244.12, 244.13

(56) References Cited

U.S. PATENT DOCUMENTS

| | | | | |
|---|---|---|---|---|
| 3,723,035 A | * | 3/1973 | Franke | 425/71 |
| 3,936,519 A | * | 2/1976 | Crystal | 264/46.1 |
| 4,022,557 A | * | 5/1977 | Johnson | 425/71 |
| 4,060,361 A | * | 11/1977 | Ziolko | 425/131.1 |
| 4,093,485 A | * | 6/1978 | Ornsteen | 156/244.13 |
| 4,222,729 A | * | 9/1980 | Ragazzini et al. | 425/378 R |
| 4,621,678 A | * | 11/1986 | Hahn et al. | 165/27 |
| 4,802,769 A | * | 2/1989 | Tanaka | 366/75 |
| 4,808,098 A | * | 2/1989 | Chan et al. | 425/72.1 |
| 4,929,408 A | * | 5/1990 | Lodder et al. | 264/149 |
| 5,041,251 A | * | 8/1991 | McCoskey et al. | 264/130 |
| 5,447,190 A | * | 9/1995 | Denisart et al. | 165/2 |
| 5,542,834 A | * | 8/1996 | Lupke | 425/133.1 |
| 5,641,445 A | * | 6/1997 | Fauble et al. | 264/171.24 |
| 5,716,574 A | * | 2/1998 | Kawasaki | 264/171.17 |

* cited by examiner

Primary Examiner—Jan H. Silbaugh
Assistant Examiner—Emmanuel Luk
(74) Attorney, Agent, or Firm—MacCord Mason PLLC

(57) ABSTRACT

An apparatus for continuously forming thermoplastic adhesive cartridges. A molten thermoplastic adhesive supply provides a supply of molten adhesive to a pump downstream from the molten thermoplastic adhesive supply. The pump then provides a molten thermoplastic adhesive melt stream which passes through a screen filter downstream from the pump to prevent the discharge of impurities in the molten thermoplastic adhesive melt stream from the pump. A temperature-controlled conduit downstream from the pump then lowers the temperature of the molten plastic melt stream to closely above its softening point. A continuous molder located downstream from the melt pump for receives the molten plastic melt stream from the melt pump to form the thermoplastic adhesive cartridge continuously.

24 Claims, 2 Drawing Sheets

APPARATUS FOR FORMING ADHESIVE CARTRIDGES

BACKGROUND OF THE INVENTION (1) Field of the Invention

The present invention relates generally to extrusion of plastic materials and, more particularly, to an apparatus for continuous forming hot melt adhesive cartridges.

(2) Description of the Prior Art

Commercial hot melt adhesives are used extensively in a variety of manufacturing applications. These applications include the attachment of furniture trim, packaging labels and profile caps. Typically, these adhesives are provided in cartridge form comprising cylinders of hardened adhesive having a diameter of between about 10 and 20 mm. Depending on the chemical makeup of the adhesive, the cylinders are extruded in continuous fashion through a conventional extruder using a similar process to that of plastic extrusion. However, this has only been true for the smaller sizes. The smaller sizes do not usually require external support since most of the compositions cool and harden quickly. Larger diameter cartridges, greater than about 43 mm, have required the use of single cavity mold to form the desired shape and allow sufficient time for cooling. For example, adhesives such as low tack ethylene vinyl acetate (EVA) are first pelletized and then fed into an extruder.

However, some commercial hot melt thermoplastic adhesives, such as high tack ethylene vinyl acetate (EVA) or amorphous polyalphaolefins (APAO), can not be extruded conventionally. This is because these compositions are so "tacky" that the pellets lump together and the plastic can not be extruded. That is, pellets formed from these adhesives do not flow readily but rather form a conglomerate mass that plugs the extruder feed chute. These types of adhesives must be formed using a batch process that involves filling a series of cylindrical molds with molten adhesive. The molds are cooled and the adhesive is trimmed and removed from the mold.

Even with best automation equipment available, the maximum through put using this batch process is between about 70 and 100 pounds per hour. In addition, the batch process is labor intensive and generates a large amount of scrap adhesive that must be recycled. In addition, it would be desirable if the palletizing step could be eliminated.

Thus, there is a need for an apparatus for forming thermoplastic adhesive cartridges which operates continuously while, at the same time, does not require that the thermoplastic adhesive be pelletized before use.

SUMMARY OF THE INVENTION

The present invention is directed to an apparatus for continuously forming thermoplastic adhesive cartridges. A molten thermoplastic adhesive supply provides a supply of molten adhesive to a pump downstream from the molten thermoplastic adhesive supply. The pump then provides a molten thermoplastic adhesive melt stream which passes through a screen filter downstream from the pump to prevent the discharge of impurities in the molten thermoplastic adhesive melt stream from the pump. A temperature-controlled conduit downstream from the pump then lowers the temperature of the molten plastic melt stream to closely above its softening point.

A continuous molder is located downstream from the melt pump for receiving the molten plastic melt stream from the melt pump to form the thermoplastic adhesive cartridge continuously. The continuous molder includes a molten mold material supply and a die head for receiving the molten mold material and forming a continuous mold. A cooling zone upstream from the discharge of the melt pump and downstream from the die head cools the molten mold material below its softening point temperature to form the continuous mold prior to receiving the molten thermoplastic adhesive.

The cooling zone includes a vacuum chamber for receiving the molten mold material from the die head and expanding the outer wall of the continuous mold outwardly. A calibrator assembly surrounds the continuous mold for controlling the outward expansion of the outer wall of the continuous mold. Finally, a cooling fluid surrounds the molten mold material to cool and solidify the mold material. A second cooling zone downstream from the discharge of the melt pump then cools the molten plastic melt stream discharged into the continuous mold below its softening point temperature to form the thermoplastic adhesive inside the continuous mold.

In addition, in the preferred embodiment, a conveyor downstream from the cooling zones moves the continuous mold and adhesive downstream at a speed proportion to the rate of discharge of the molten plastic material into the continuous mold.

Finally, a cutter downstream from the conveyor removes the continuous mold from the thermoplastic adhesive and cuts the adhesive into predetermined lengths for subsequent use.

Accordingly, one aspect of the present invention is to provide an apparatus for forming a plastic body. The apparatus includes: a molten plastic supply; a pump downstream from the molten plastic supply for providing a molten plastic melt stream; and a temperature-controlled conduit downstream from the pump for lowering the temperature of the molten plastic melt stream to closely above its softening point.

Another aspect of the present invention is to provide a melt pump for an apparatus for forming a thermoplastic adhesive cartridge. The apparatus includes: a molten thermoplastic adhesive supply; a pump downstream from the molten thermoplastic adhesive supply for providing a molten thermoplastic adhesive melt stream; a screen filter downstream from the pump for preventing the discharge of impurities in the molten thermoplastic adhesive melt stream from the pump; and a temperature-controlled conduit downstream from the pump for lowering the temperature of the molten plastic melt stream to closely above its softening point.

Still another aspect of the present invention is to provide an apparatus for continuously forming thermoplastic adhesive cartridges. The apparatus includes: a molten thermoplastic adhesive supply; a pump downstream from the molten thermoplastic adhesive supply for providing a molten thermoplastic adhesive melt stream; a screen filter downstream from the pump for preventing the discharge of impurities in the molten thermoplastic adhesive melt stream from the pump; a temperature-controlled conduit downstream from the pump for lowering the temperature of the molten plastic melt stream to closely above its softening point; and a continuous molder downstream from the melt pump for receiving the molten plastic melt stream from the melt pump.

These and other aspects of the present invention will become apparent to those skilled in the art after a reading of the following description of the preferred embodiment when considered with the drawings.

DESCRIPTION OF THE PREFERRED EMBODIMENTS

Figure 1:
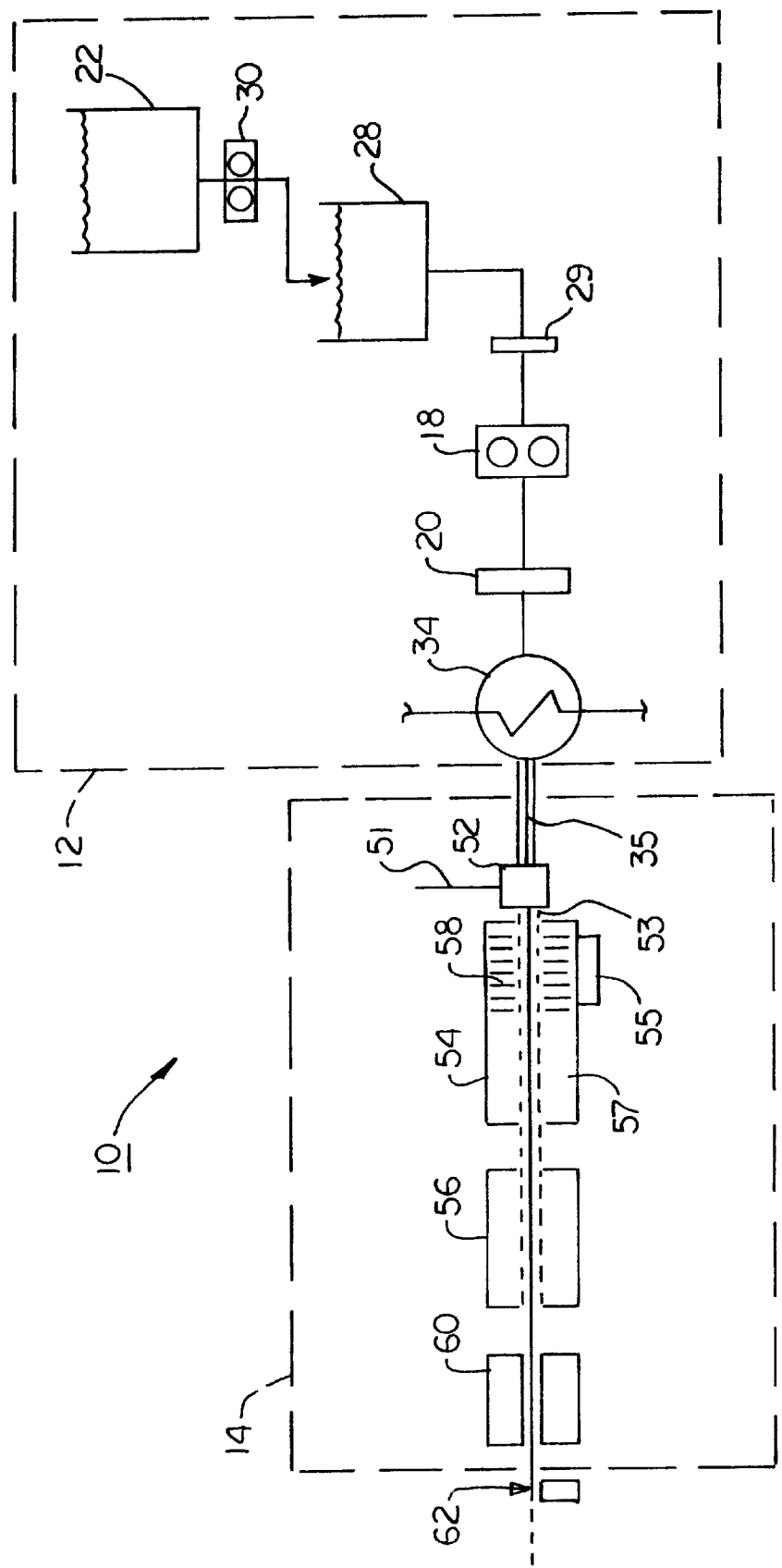
FIG. 1 is a schematic diagram of an apparatus for continuously forming thermoplastic adhesive cartridges constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an apparatus for continuous forming thermoplastic adhesive cartridges, generally designated 10, is shown constructed according to the present invention. The system 10 includes two major sub-assemblies: a melt pump 12 and a continuous molder 14.

The melt pump 12 includes a molten thermoplastic adhesive supply comprising an adhesive mixer 22 in which the adhesive components are initially melted to form an adhesive melt. Depending on the particular adhesive being prepared, the temperature in the mixer may vary between about 200° F. and 450° F. The melt is transferred via pump 30 to a melt holding tank 28. Both the mixer 22 and the holding tank 28 are insulated and may be provided with hot oil jacket heaters to maintain the adhesive in a molten state. A second pump 18 is connected to a holding tank 28. The holding tank 28 desirably is installed at a higher elevation than the pump 18 to create a gravity feed to the pump and to ensure that the pump 18 is provided with a sufficient net positive suction head. A pre-filter 29 may be provided on the suction side of pump 18. Preferably, the pump 18 is a positive displacement pump, and more preferably, a gear pump. Gear type pumps offer the advantage of precise volume control, which is important to the practice of the present invention.

The pump 18 discharges to downstream filter 20, which desirably is a changeable dual screen, pack-type filter well known in the plastic extrusion field. The filter serves to remove any unmelted adhesive components or particulate matter from the melt stream. Alternatively, a continuous filter, such as that available from Gneuss of Bad Oeynhausen, Germany and Matthews, N.C. may be used. The advantage of a continuous filter is that its use avoids momentary flow interruptions that may cause problems downstream of the filter.

The still molten adhesive then travels to a temperature control system which includes a first heat zone located at the inlet to heat exchanger 34. Although it is expected that any suitable heat exchanger may perform adequately, a particularly desirable construction is a tube and shell heat exchanger that uses a water cooling medium to cool the melt stream to just above the softening point of the molten adhesive. In a preferred embodiment, thermal oil may be used a heating medium and water as a cooling medium.

Thus, the heat exchanger creates a second, lower temperature zone at its exit.

The term "softening point" refers to the "ring and ball" test as determined by ASTM test procedure E28 (06.03). Typical softening points for various hot melt adhesives that may be prepared according to the present invention are shown in Table 1 below. These compositions are available from Jowat Corporation of High Point, N.C.

TABLE 1

| Adhesive | Softening Point (° C.) |
|---|---|
| JT 286 00 (EVA) | 110–120 |
| JT 268 00 (APAO) | 95–100 |

Precise temperature control through the heat exchanger 34 is desirable as it has been observed that, for adhesives having a crystalline structure, the molten adhesive is more prone to solidify on the heat exchanger tubes thus forming an insulating blanket thereon. It will be readily understood that this insulator interferes with the proper performance of the heat exchange. The heat exchanger 34 may further include an internal static mixer to create turbulent flow of the adhesive therethrough and thus more efficient heat exchange.

Figure 2:
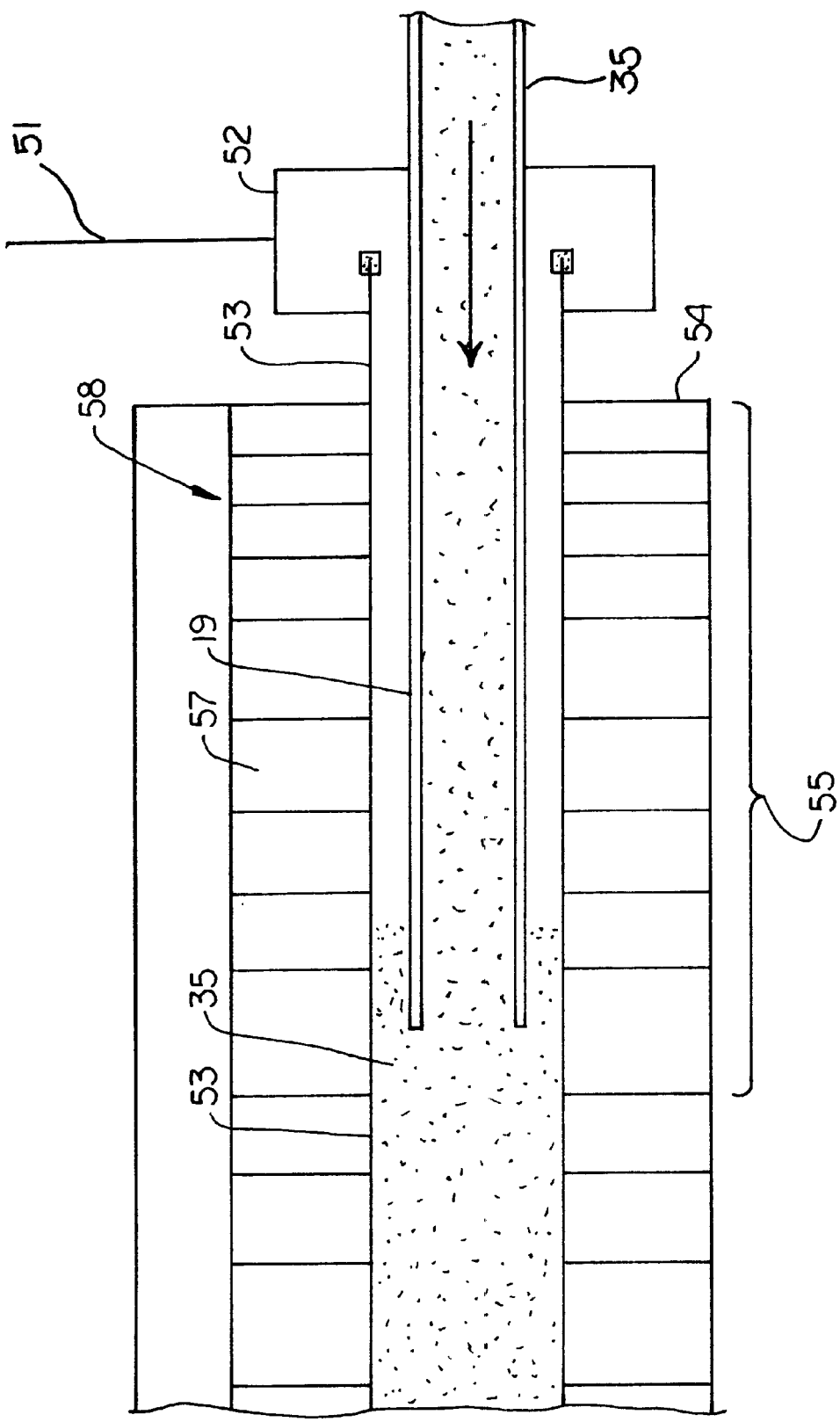
FIG. 2 is an enlarged, partial sectional view of the cooling chamber of the present invention shown in FIG. 1.

From heat exchanger 34, the softened adhesive 35 is fed to continuous molder 14. The continuous molder 14 includes molten mold material supply 51 that is fed to a crosshead die 52 to form a continuous thermoplastic mold for forming the adhesive profile 35. Referring to FIG. 2, desirably, the inside diameter of the thermoplastic mold 53 as it exits the crosshead die 52 is greater that that of the pump discharge line 19.

Any suitable thermoplastic material may be used for the continuous mold 53, as long as the softening temperature of the mold material is greater than the softening temperature of the thermoplastic adhesive, with low-density polyethylene being preferred. A suitable cross head extruder for this purpose is a Model DS 50H available from Davis-Standard of Somerville, N.J.

The thermoplastic material making up the mold exits the die head in a molten state. The softened adhesive and the thermoplastic material then enter a cooling chamber 54, which is maintained under a vacuum. The cooling chamber 54 contains a cooling fluid bath 57 that completely covers and hardens the mold 53 immediately upon its entry into the chamber. Desirably, the cooling fluid is chilled water maintained at a temperature between about 32° F. and about 50° F. Other cooling fluids that are compatible with the adhesive and the mold material may be used. A vacuum of between about 6 and 25 inches of water is created in the chamber 54. Lower vacuum ranges then about 6 have been found to sometimes produce an unstable mold. Higher vacuum ranges than about 25 do not appear to significantly increase mold stability. Because of the vacuum, the thermoplastic mold expands to contact the calibrator assembly as described below.

As best seen in FIG. 2, a first cooling zone 55 is defined in the chamber between the chamber entry point and a point downstream of the entry at which the mold has hardened sufficiently to contain the softened adhesive without melting the mold. Thus, the cooling zone is positioned at a point upstream of the adhesive pump discharge so that the softened adhesive discharges into a continuous hardened tube of mold material. Because the mold is comprised of a thin skin of thermoplastic material, it will be flexible even after it is hardened.

The adhesive completely fills the inside diameter of the mold because a slight backpressure is purposely created at the process startup to cause the pump discharge 19 to be submerged in adhesive. Desirably, the adhesive extends upstream past the end of the discharge tube for a short distance (i.e. the adhesive backfilled around the tube). It has been discovered that this arrangement improves tube filling. The flow rate of the adhesive is controlled within tight tolerances to maintain this amount of submergence. For example, if the adhesive flow rate is too high, over backfilling can occur and the adhesive can fill completely the air space between the outside of the pump discharge tube and the mold and break the continuous mold.

It has been found that gear type pumps provide sufficient performance to meet the needs described above. Gear pumps transport precise amounts of fluid with each rotation of the pump elements. Thus, controlling the speed of the pumps permits the flow rate of the adhesive to be controlled precisely. As discussed above, precise control is needed to maintain the pump discharge submergence, however future improvements in extruder designs may permit substitution for the gear pump if the flow rate can be sufficiently controlled.

The outside diameter of the mold and indirectly the outside diameter of the adhesive profile is controlled by calibrator assembly 58 which is comprised of a plurality of spaced apart, donut-shaped plastic rings. The centerline of each of the rings is aligned with the center of the adhesive profile. The vacuum in the cooling zone causes the mold 53 to swell so that it maintains contact with the rings. As can be seen, the ring spacing generally increases as the mold/adhesive travels through the vacuum chamber since less support is required as the mold solidifies. The vacuum chamber may also include a plurality of support rollers downstream from calibrator assembly 58 to prevent the adhesive profile from sagging.

A second cooling zone is defined starting at a point at which the mold is hardened sufficiently to carry the adhesive. It is in this cooling zone that the adhesive is cooled until it is hardened. The second cooling zone extends through the remaining length of the cooling chamber 54 and extends to second cooling chamber 56. The second cooling chamber 56 is also provided with a chilled water bath. Additional cooling chambers may be provided downstream of the second cooling chamber 56 as desired. It is believed that increasing the number of cooling chambers permits the adhesive throughput to be increased.

A puller 60 is provided downstream of the last cooling chamber for pulling the mold encased adhesive from the pump. A suitable puller assembly is the Model 210 6P-48 available from Conaire of Pittsburgh, Pa. This puller is comprised of upper and lower flexible continuous belts that engage the upper and lower surfaces of the adhesive profile.

A cutter 62 cuts the continuous adhesive profile into cartridge sized sections for use in a variety of commercial glue applicators. A suitable cutter apparatus for the practice of the present invention is the Model SC5, also available from Conaire.

Certain modifications and improvements will occur to those skilled in the art upon a reading of the foregoing description. By way of example, inorganic and organic fillers could be added to the melt to modify the end characteristic of the cartridges. Also, EVA having a low melt index could be used to form the continuous molding skin which would allow the skin to be left on the extruded EVA adhesive cartridge. While the preferred cross-section of the cartridge is round, an oval shape could be formed. It should be understood that all such modifications and improvements have been deleted herein for the sake of conciseness and readability but are properly within the scope of the following claims.

We claim:

1. An apparatus for forming a continuous plastic body with a hardened tube of mold material surrounding a molten core of plastic, said apparatus comprising:
   (a) a molten plastic supply;
   (b) a pump downstream from said molten plastic supply for providing a molten plastic melt stream, for forming said molten core;
   (c) a temperature-controlled conduit downstream from said pump for lowering the temperature of said molten plastic melt stream to above its softening point, wherein said temperature-controlled conduit includes at least a first heat zone at the inlet of said conduit and a second heat zone at the outlet of said conduit and the temperature of said temperature-controlled conduit is controlled by a tubular heat exchanger surrounding said conduit;
   (d) a continuous molder downstream from said pump for receiving said molten plastic melt stream from said pump including a molten mold material supply and a crosshead die for receiving said molten mold material and forming a continuous mold; and
   (e) a first cooling zone upstream from the discharge of said melt pump and downstream from said die head for cooling said molten mold material below its softening point temperature to form said continuous mold wherein said first cooling zone includes a vacuum chamber for receiving said molten mold material from said crosshead die and expanding the outer wall of said continuous mold outwardly, a calibrator assembly surrounding said continuous mold for controlling the outward expansion of the outer wall of said continuous mold, and a cooling fluid surrounding said molten mold material.

2. The apparatus according to claim 1, wherein said calibrator assembly includes a plurality of axially spaced guide rings.

3. The apparatus according to claim 2, wherein said plurality of axially spaced guide rings are variaby spaced to provide additional support to the upstream portion of the outer wall of said continuous mold.

4. The apparatus according to claim 1, further including at least a second cooling zone downtown from the discharge of said pump for cooling said molten plastic melt stream discharge into said continuous mold below its softening point temperature to form said plastic body.

5. The apparatus according to claim 4, further including a conveyor downstream from said cooling zone for moving said plastic body downstream at a speed equal to the rate of discharge of said molten plastic into said continuous mold.

6. The apparatus according to claim 5, further including a cutter downstream from said conveyor for cutting said plastic body into predetermined lengths.

7. The apparatus according to claim 1, wherein the discharge of said pump is downstream from the point at which said molten mold material is cooled below its softening point temperature to form said continuous mold.

8. The apparatus according to claim 7, wherein the rate of discharge of said pump is equal to the speed that said molten mold material is formed into said continuous mold.

9. An apparatus for continuously forming continuous thermoplastic adhesive cartridges with a hardened tube of mold material surrounding a molten core of thermoplastic adhesive, said apparatus comprising:

(a) a molten thermoplastic adhesive supply;

(b) a pump downstream from said molten thermoplastic adhesive supply for providing a molten thermoplastic adhesive melt stream;

(c) a screen filter downstream from said pump for preventing the discharge of impurities in said molten thermoplastic adhesive melt stream from said pump;

(d) a temperature-controlled conduit downstream from said pump for lowering the temperature of said molten plastic melt stream to above its softening point, wherein said temperature-controlled conduit includes at least a first heat zone at the inlet of said conduit and a second heat zone at the outlet of said conduit and the temperature of said temperature-controlled conduit is controlled by a tubular heat exchanger surrounding said conduit;

(e) a continuous molder downstream from said pump for receiving said molten plastic melt stream from said pump including a molten mold material supply and a crosshead die for receiving said molten mold material and forming a continuous mold; and (f) a first cooling zone upstream from the discharge of said melt pump and downstream from said die head for cooling said molten mold material below its softening point temperature to form said continuous mold wherein said first cooling zone includes a vacuum chamber for receiving said molten mold material from said crosshead die and expanding the outer wall of said continuous mold outwardly, a calibrator assembly surrounding said continuous mold for controlling the outward expansion of the outer wall of said continuous mold, and a cooling fluid surrounding said molten mold material.

10. The apparatus according to claim 9, wherein said calibrator assembly includes a plurality of axially spaced guide rings.

11. The apparatus according to claim 10, wherein said plurality of axially spaced guide rings are variably spaced to provide additional support to the upstream portion of the outer wall of said continuous mold.

12. The apparatus according to claim 9, further including at least a second cooling zone downstream from the discharge of said pump for cooling said molten plastic melt stream discharged into said continuous mold below its softening point temperature to form said plastic body.

13. The apparatus according to claim 12, further including a conveyor downstream from said cooling zone for moving said plastic body downstream at a speed equal to the rate of discharge of said molten plastic material into said continuous mold.

14. The apparatus according to claim 13, further including a cutter downstream from said conveyor for cutting said plastic body into predetermined lengths.

15. The apparatus according to claim 9, wherein the discharge of said pump is downstream from the point at which said molten mold material is cooled below its softening point temperature to form said continuous mold.

16. The apparatus according to claim 15, wherein the rate of discharge of said pump is equal to the speed that said molten plastic material is formed into said continuous mold.

17. The apparatus according to claim 9, wherein said molten thermoplastic adhesive supply includes an adhesive feed and a high temperature mixer for forming said molten thermoplastic adhesive.

18. The apparatus according to claim 17, wherein the temperature of said high temperature mixer for forming said molten thermoplastied/adhesive is above the softening point of said thermoplastic adhesive to allow the thermoplastic adhesive to flow freely.

19. The apparatus according to claim 17, further including a holding tank downstream from said high temperature mixer, a transfer pump between said mixer and said holding tank for transferring said molten thermoplastic adhesive from said mixer to said holding tank, and a heater for maintaining the temperature of said molten thermoplastic adhesive above the softening point of said thermoplastic adhesive to allow the thermoplastic adhesive to flow freely.

20. The apparatus according to claim 17, wherein said pump downstream from said molten thermoplastic adhesive supply for providing a molten thermoplastic adhesive melt stream is a positive displacement pump.

21. The apparatus according to claim 20, wherein said positive displacement pump is a gear pump.

22. The apparatus according to claim 17, wherein said screen filter is a dual screen filter.

23. The apparatus according to claim 17, wherein said screen filter is a continuous rotary filter.

24. The apparatus according to claim 17, wherein said tubular heat exchanger surrounding said conduit includes a static mixer for creating turbulent flow for improving temperature control.

* * * * *